United States Patent
Li et al.

(10) Patent No.: US 9,232,230 B2
(45) Date of Patent: Jan. 5, 2016

(54) METHOD AND DEVICE TO IDENTIFY MOTION VECTOR CANDIDATES USING A SCALED MOTION SEARCH

(75) Inventors: Ying Li, Richmond Hill (CA); Xu Gang Zhao, Maple (CA)

(73) Assignee: VIXS SYSTEMS, INC., Toronto (CA)

( * ) Notice: Subject to any disclaimer, the term of this patent is extended or adjusted under 35 U.S.C. 154(b) by 607 days.

(21) Appl. No.: 13/425,522

(22) Filed: Mar. 21, 2012

(65) Prior Publication Data

US 2013/0251024 A1     Sep. 26, 2013

(51) Int. Cl.
*H04N 7/50* (2006.01)
*H04N 19/53* (2014.01)
*H04N 19/56* (2014.01)

(52) U.S. Cl.
CPC .............. *H04N 19/53* (2014.11); *H04N 19/56* (2014.11)

(58) Field of Classification Search
None
See application file for complete search history.

(56) References Cited

U.S. PATENT DOCUMENTS

| | | | |
|---|---|---|---|
| RE39,455 E * | 1/2007 | Tan | 375/240.15 |
| 8,411,757 B2 * | 4/2013 | Karczewicz et al. | 375/240.25 |
| 2005/0175099 A1 * | 8/2005 | Sarkijarvi et al. | 375/240.16 |
| 2008/0075165 A1 * | 3/2008 | Ugur et al. | 375/240.12 |
| 2010/0002770 A1 * | 1/2010 | Motta et al. | 375/240.16 |
| 2010/0316129 A1 | 12/2010 | Zhao et al. | |
| 2012/0207220 A1 * | 8/2012 | Kim et al. | 375/240.16 |

* cited by examiner

*Primary Examiner* — Allen Wong
*Assistant Examiner* — Samuel D Fereja (57) ABSTRACT

A scaled motion search section can be used in a video processing device that processes a video input signal that includes a plurality of pictures. The scaled motion search section includes a downscaling module that downscales the plurality of pictures to generate a plurality of downscaled pictures, wherein the downscaling module includes a horizontal downscaling filter and a vertical downscaling filter, and wherein the vertical downscaling filter generates downscaled pixels for a macroblock pair using only pixels from the macroblock pair. A transfer function that models the scaled motion vectors is determined and used to identify a final set of motion vector candidates used in a larger scale motion search.

16 Claims, 7 Drawing Sheets

METHOD AND DEVICE TO IDENTIFY MOTION VECTOR CANDIDATES USING A SCALED MOTION SEARCH

TECHNICAL FIELD OF THE DISCLOSURE

The present disclosure relates to encoding used in devices such as video encoders/decoders.

DESCRIPTION OF RELATED ART

Video encoding is becoming a common feature of modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding (AVC). While these standards set forth many powerful techniques, further improvements are possible to improve the performance and speed of implementation of such methods. For example, it is desirable to improve the performance of techniques used to identify motion vectors used by such standards.

DETAILED DESCRIPTION OF THE DISCLOSURE INCLUDING THE PRESENTLY PREFERRED EMBODIMENTS

Figure 1:
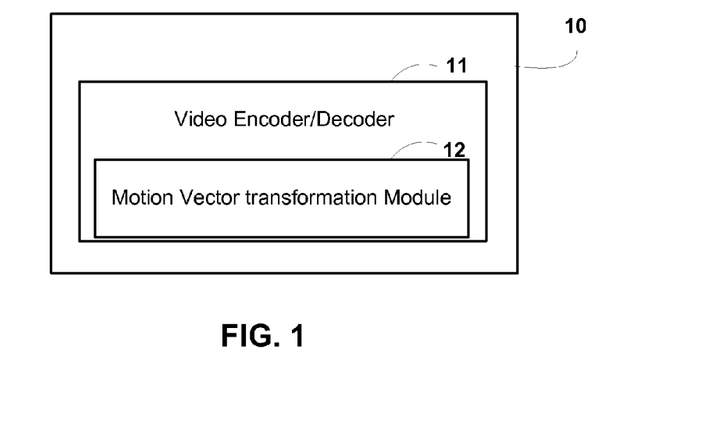
FIG. 1 illustrates a block diagram representative of various video devices in accordance with embodiments of the present disclosure.

FIG. 1 illustrates a block diagram representation of a device 10 having video encoding capabilities in accordance with the present disclosure. In various embodiments, the device 10 can be a set top box with built-in digital video recorder functionality, a stand-alone digital video recorder, a general purpose computer, and the like. The device 10 can be a portable or non-portable device. For example, portable devices having self-contained power sources include handheld devices, laptop computers, and the like. Device 10 includes a video encoder/decoder 11 having a motion vector transform module 12 that uses a transfer function to determine a set of estimated motion vectors that can be used as motion vector candidates by a motion search engine. In one embodiment, the transfer function can be based on a set of scaled motion vectors (SMVs) that are determined by motion searching scaled pictures associated with a scaled video stream being encoded. Thus, the SMVs are evaluated by a fitting algorithm that determines a transfer function that models a relationship between locations of macroblocks of a scaled video picture and their corresponding motion vectors. The transfer function can also be used to further refine the motion vector candidates provided to a motion search engine that determines motion vectors of the higher-resolution target video stream. While illustrated generically, device 10 includes any device that is capable of encoding, decoding and/or transcoding video content in accordance with the methods and systems described in conjunction with FIGS. 2-8 and the appended claims.

Figure 2:
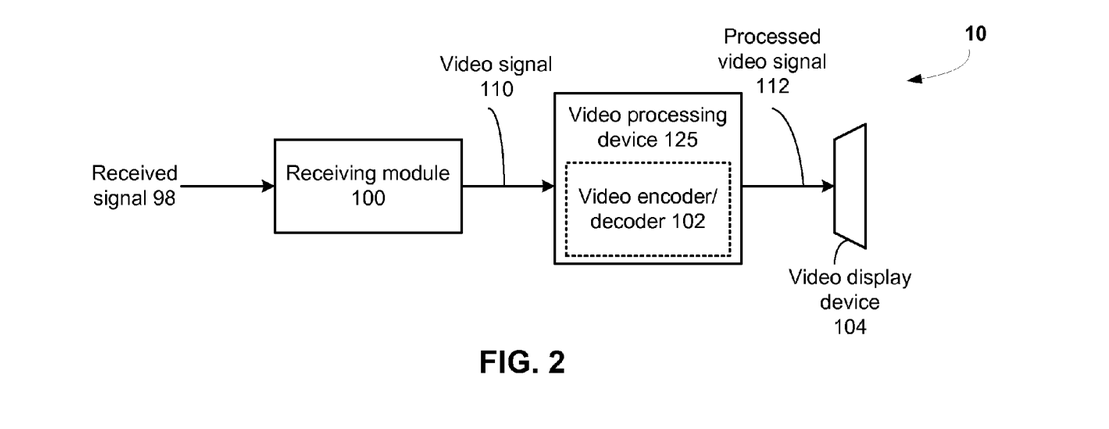
FIG. 2 illustrates a block diagram representation of a video device in accordance with an embodiment of the present disclosure.

FIG. 2 is a block diagram representation of video device 10 in accordance with an embodiment of the present disclosure. In particular, the video device 10 of FIG. 2 includes a receiving module 100, a video processing device 125, and a video display device 104. The receiving module can include a television receiver, cable television receiver, satellite broadcast receiver, broadband modem, 3G transceiver or other information receiver or transceiver that is capable of receiving a received signal 98 and processing one or more video signals 110 that can be provided via time division demultiplexing, frequency division demultiplexing or other demultiplexing technique. Video processing device 125 includes video encoder/decoder 102 that is coupled to the receiving module 100, and which represents a particular embodiment of the video encoder/decoder 11 of FIG. 1. Video processing device 125 is used to encode, decode or transcode the a received video signal for storage, editing, and/or playback in a format corresponding to video display device 104, which may or may not be part of the device 10.

In an embodiment of the present disclosure, the received signal 98 is a broadcast video signal, such as a television signal, high definition television signal, enhanced definition television signal or other broadcast video signal that has been transmitted over a wireless medium, either directly or through one of more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network, or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal 112 can include a digital video signal complying with a digital video codec standard such a H.264, MPEG-4 Part 10 Advanced Video Coding (AVC) or another digital format such as a Motion Picture Experts Group (MPEG) format (such as MPEG1, MPEG2, or MPEG4), Quicktime format, Real Media format, Windows Media Video (WMV) or Audio Video Interleave (AVI), etc.

Video display device 104 can include a television, monitor, computer, handheld device or other video display device that creates an optical image stream either directly or indirectly, such as by projection, based on decoding the processed video signal 112 either as a streaming video signal or by playback of a stored digital video file.

Video encoder/decoder 102 can be a video codec that operates in accordance with many of the functions and features of the H.264 standard, the MPEG-4 standard, VC-1 (SMPTE standard 421M) or other standard, to process processed video signal 112 to encode, decode, or transcode video input signal 110. Video input signal 110 is optionally formatted by a signal interface for encoding, decoding or transcoding.

Figure 3:
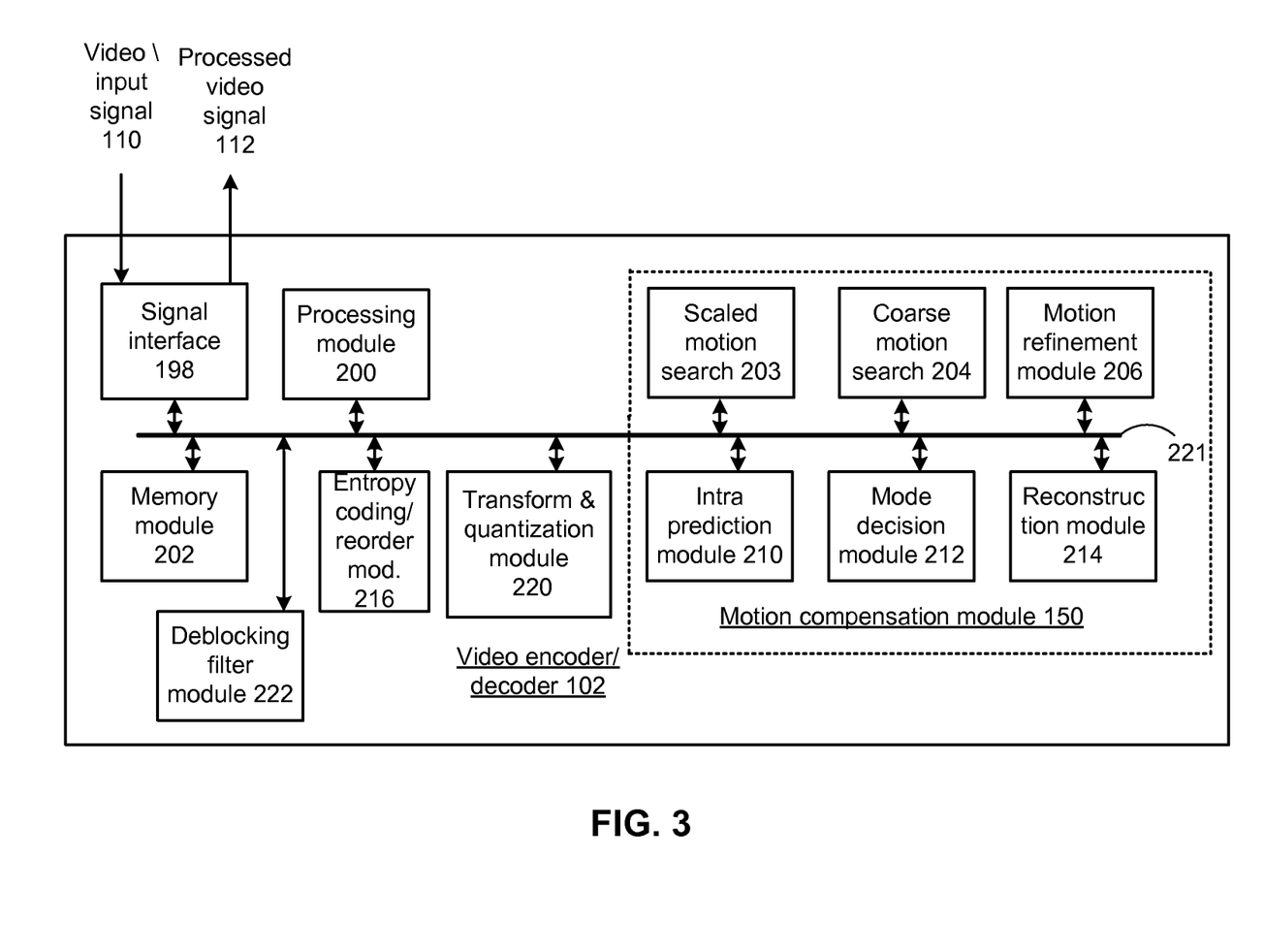
FIG. 3 illustrates a block diagram representation of a video encoder/decoder of FIG. 2 in accordance with an embodiment of the present disclosure.

FIG. 3 illustrates the video encoder/decoder 102 in greater detail to include a signal interface module 198, a processing module 200, a memory module 202, an entropy coding/reorder module 216, a transform & quantization module 220, a deblocking filter module 222, and a motion compensation module 150. Each of these modules is connected to a bus 221.

The processing module 200 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202.

Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200 and memory module 202 are further coupled, such as via bus 221, to various modules of the motion compensation module 150, including scaled motion search module 203, coarse motion search module 204, motion refinement module 206, intra-prediction module 210, mode decision module 212, and reconstruction module 214. The modules of video encoder/decoder 102 can be implemented in software or firmware and be structured as operations performed by processing module 200. Alternatively, one or more of these modules can be implemented using a hardware engine that includes a state machine, analog circuitry, digital circuitry, and/or logic circuitry, and that operates either independently or under the control and/or direction of processing module 200 or one or more of the other modules depending on the particular implementation. It should also be noted that the software implementations of the present disclosure can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present disclosure.

Video encoder/decoder 102 can operate in various modes of operation that include an encoding mode and a decoding mode that is set by the value of a mode selection signal that may be a user defined parameter provided to a user programmable register, user input, memory location or other signal. In addition, in video encoder/decoder 102, the particular standard used by the encoding or decoding mode to encode or decode the input signal can be determined by a standard selection signal that also may be a user defined parameter, user input, register value, memory value or other signal. In an embodiment of the present disclosure, the operation of the encoding mode utilizes a plurality of modules that each performs a specific encoding function. The operation of decoding also utilizes at least one of the plurality of modules to perform a similar function in decoding. In this fashion, modules such as the motion refinement module 206 and more particularly an interpolation filter used therein, and intra-prediction module 210, can be used in both the encoding and decoding process to save on architectural real estate when video encoder/decoder 102 is implemented on an integrated circuit or to achieve other efficiencies. In addition, some or all of the components or other function specific modules can be used in both the encoding and decoding process for similar purposes.

Motion compensation module 150 includes a scaled motion search module 203, as will be discussed in greater detail below, that searches for motion vectors of a scaled representation of the target video stream received at video input signal 110 being encoded. A set of motion vectors based on the scaled motion vectors is provided to the coarse motion search module 204, which can encode target pictures of the target video stream based on a segmentation of the target pictures into macroblocks of a particular pixel size, such as a 16 pixels by 16 pixels macroblock size.

In an embodiment of the present disclosure, the coarse motion search module 204 implements a coarse-scale motion search for each macroblock of a target picture to determine motion vectors that represents a displacement of the macroblock in the current picture to an integer pixel level accuracy such as to a resolution of 1-pixel. The coarse motion search engine 204 implements a motion vector search by evaluating any motion vector candidate locations preferentially. The motion vector candidates can be provided in the form of predicted motion vectors based upon the target video stream, or in the form of motion vectors based upon the scaled motion vectors determined by the scaled motion search module 203. Predicted motion vectors based on the target picture use a current picture and one or more other pictures of the target picture's video stream to identify locations of the target picture that are expected to be proximate to a location of the final motion vector. The predicted motion vectors themselves can be based upon pictures of the target video stream and selected based upon one or more criteria. Such criteria can include selecting predicted motion vectors having a lowest cost factor amongst two or more predicted motion vectors identified prior to implementing the coarse-scale motion vector search at coarse motion search module 204. The motion vector candidates can be used by the coarse motion search module 204 as initial search locations, from which a motion search is initiated to determine the 1-pixel resolution motion vector of a particular macroblock.

In an embodiment of the present disclosure, motion searching can calculate a cost formulation that is based on the Sum of Absolute Difference (SAD) between reference macroblock and candidate macroblock pixel values and a weighted rate term that represents the number of bits required to be spent on coding the difference between the candidate motion vector and either a predicted motion vector (PMV) that is based on the neighboring macroblock to the left of the current macroblock and one or more motion vectors from neighboring current macroblocks of a prior row of the video input signal or an estimated predicted motion vector that is determined based on motion vectors from neighboring current macroblocks of a prior row of the video input signal. In an embodiment of the present disclosure, the cost calculation avoids the use of neighboring subblocks within the current macroblock. In this fashion, coarse motion search module 204 is able to operate on a macroblock to contemporaneously determine the motion search motion vector for each subblock of the macroblock.

A motion refinement module 206 generates one or more a fine-scale motion vectors based corresponding one-pixel resolution motion vectors provided by the motion search module 204. For example, a fine-scale motion vector can be determined for each macroblock of the plurality of macroblocks, and for each block of each macroblock. In an embodiment of the present disclosure, the motion refinement module 206 determines, for each macroblock of the video input signal 110, a refined motion vector that represents the displacement of the macroblock from a reference frame or from a reference field of the video stream to a current picture to a greater pixel level accuracy that the coarse motion search module 104, such as to a resolution of ¼-pixel or other sub-pixel resolution.

Locations evaluated by the motion refinement module 206 can also be evaluated based on a cost formulation to determine the refined motion vector having a most favorable cost. As in the case with the motion search module, a cost formulation can be based on the sum of the Sum of Absolute Difference (SAD) between a reference macroblock, e.g., the previously evaluated candidate with the lowest cost, and the current candidate macroblock.

While the prior modules have focused on inter-prediction of the motion vector, intra-prediction module 210 generates a best intra prediction mode for each macroblock of the plurality of macroblocks. In an embodiment of the present disclosure, intra-prediction module 210 operates as defined by the H.264 standard. However, other intra-prediction techniques can likewise be employed. In particular, intra-prediction module 210 operates to evaluate a plurality of intra prediction modes such as a Intra-4×4 or Intra-16×16, which are luma prediction models, chroma prediction (8×8) or other intra coding, based on motion vectors determined from neighboring macroblocks to determine the best intra prediction mode and the associated cost.

A mode decision module 212 determines a final macroblock cost for each macroblock of the plurality of macroblocks based on costs associated with the refined motion vector, the direct mode motion vector, and the best intra prediction mode, and in particular, the method that yields the most favorable (lowest) cost, or an otherwise acceptable cost. A reconstruction module 214 completes the motion compensation by generating residual luma and/or chroma pixel values for each macroblock of the plurality of macroblocks.

A forward transform and quantization module 220 of video encoder/decoder 102 generates processed video signal 112 by transforming coding and quantizing the residual pixel values into quantized transformed coefficients that can be further coded, such as by entropy coding in entry coding module 216, filtered by de-blocking filter module 222. In an embodiment of the present disclosure, further formatting and/or buffering can optionally be performed by signal interface 198 and the processed video signal 112 can be represented as being output therefrom.

The deblocking filter module 222 operates according to a set of filtering strengths determined by using the neighbors' motion vectors, quantization parameters, reference index, and coded-block-patterns, etc. For entropy coding in entry coding module 216, the motion vector differences (MVD), macroblock types, quantization parameter data, inter predication type, etc. are used.

Figure 4:
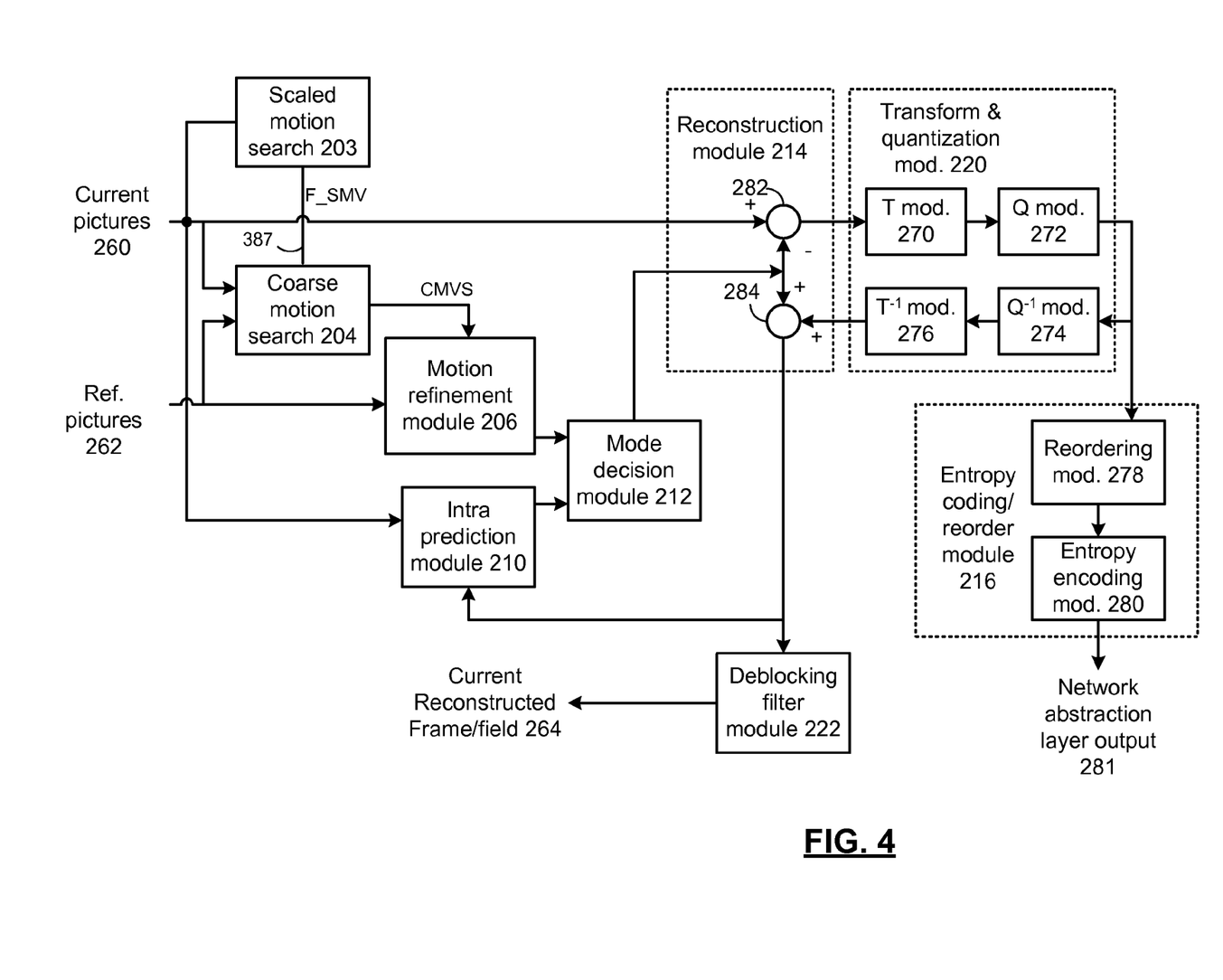
FIG. 4 illustrates a block diagram representative of portions of FIG. 3 in greater detail in accordance with a specific embodiment of the present disclosure.

Further details of specific encoding and decoding processes will be described in greater detail in conjunction with FIGS. 4 and 5.

A specific embodiment of operation in accordance with the present disclosure described with reference to the block diagram the video encoder of FIG. 4. In particular, an example video encoding is described that uses many of the function specific modules described in conjunction with FIG. 3 to implement a similar encoding operation.

The current picture 260, which is being encoded and also referred to as the target picture 260, is received at the motion search module 204 and at the scaled motion search module 203. In one embodiment, the current picture can be rendered from an encoded picture received as part of video signal 110. The scaled motion search module 203 scales the target picture 260 to obtain a scaled picture and implements a motion search of the scaled picture relative to previous scaled pictures to determine motion vectors (actual scaled motion vectors) for the scaled picture's macroblocks. The scaled motion search module 203 further determines a set motion vectors for the scaled picture that are calculated (calculated motion vectors) using a transfer function derived from the scaled motion vectors. A final set of scaled motion vectors (F_SMV) selected from the actual scaled motion vectors and from the calculated motion vectors is provided to the coarse motion search module 204.

The final set of scaled motion vectors and the transfer function based upon the actual scaled motion vectors are used by coarse motion search module 204 to determine a set of candidate motion vectors that used as evaluation starting points of a motion vector search implemented coarse motion search module 204, which performs a motion vector search of the target picture 260, with respect to reference pictures 262, to generate a coarse-scale motion search motion vector (CMVS) for each macroblock of the target picture 260.

Motion refinement module 206 is a fine resolution motion search module that generates a refined motion vector for each macroblock of the plurality of macroblocks, based on the motion search motion vector determined at motion search module 204. Intra-prediction module 210 evaluates and chooses a best intra prediction mode for each macroblock of the plurality of macroblocks. Mode decision module 212 determines a final motion vector for each macroblock of the plurality of macroblocks based on costs associated with the refined motion vector, and the best intra prediction mode.

Reconstruction module 214 generates residual pixel values corresponding to the final motion vector for each macroblock of the plurality of macroblocks by subtraction from the pixel values of the current frame/field 260 by difference circuit 282 and generates unfiltered reconstructed frames/fields by re-adding residual pixel values (processed through transform and quantization module 220) using added circuit 284. The transform and quantization module 220 transforms and quantizes the residual pixel values in transform module 270 and quantization module 272 and reforms residual pixel values by inverse transforming and dequantization in inverse transform module 276 and dequantization module 274. In addition, the quantized and transformed residual pixel values are reordered by reordering module 278 and entropy encoded by entropy encoding module 280 of entropy coding/reordering module 216 to form network abstraction layer output 281.

Deblocking filter module 222 forms the current reconstructed framers/fields 264 from the unfiltered reconstructed frames/fields. It should also be noted that current reconstructed frames/fields 264 can be buffered to generate reference frames/fields 262 for future current frames/fields 260.

Figure 5:
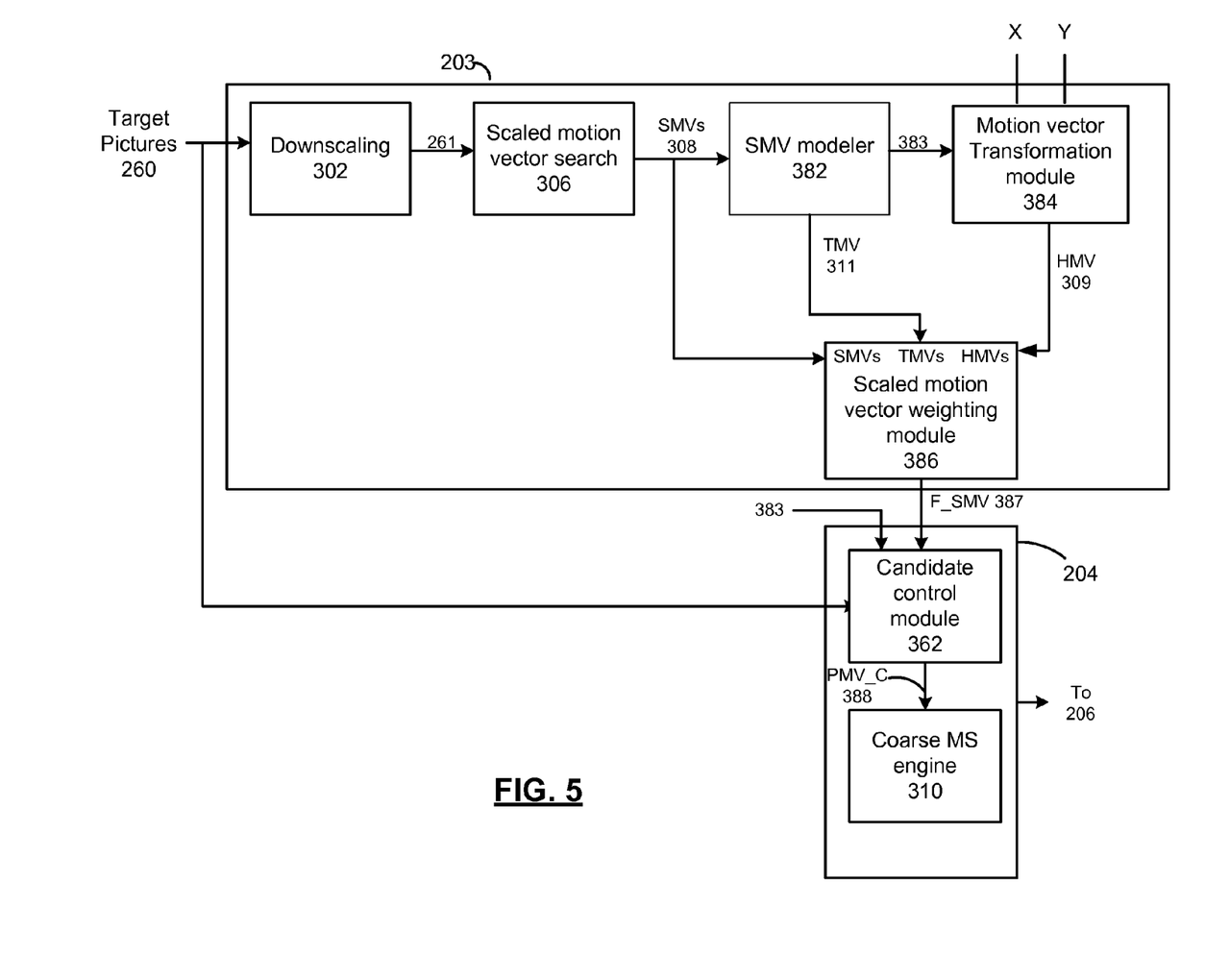
FIG. 5 illustrates a block diagram representative of search modules of FIG. 4 in accordance with an embodiment of the present disclosure.

FIG. 5 illustrates a block diagram including particular embodiments of scaled motion search module 203 and coarse motion search module 204 in accordance with an embodiment of the present disclosure. In particular, scaled motion search module 203 generates a scaled target picture at downscaling module 302 to generate a plurality of downscaled pictures 261 for further processing by a scaled motion vector search module 306, an SMV modeler 382, a motion vector transform module 384, and a scaled motion vector waiting module 386. In accordance with a particular embodiment, the downscaled pictures 261 have the same number of macroblocks/blocks as the target pictures 260 with each macroblock/block of the downscaled pictures being represented a different number of pixels than the target pictures.

The scaled motion vector search module 306 is adapted to implement a motion search using the scaled picture 261 and previous scaled reference pictures to determine scaled motion vectors (SMVs) 308 corresponding to the macroblock of the scaled picture. In an embodiment of the present disclosure, original video frames, which themselves can be rendered during transcoding, rather than reconstructed video frames are downscaled by downscaling module 302 and used as reference pictures in the reduced-scale MS module 306. Accordingly, the scaled motion vector search module 306 can generate motion vector candidates 308 one picture ahead of the coarse motion search module 383. Assuming the target picture is downscaled at the downscaling module 302 by a factor of two in both the x-coordinate and y-coordinate directions, the number of pixels representing the macroblocks, and their subblocks, in the scaled picture 261 will be one-fourth the number of pixels used to represent the macroblocks and their subblocks of the target picture 260. For example, instead of 16×16 pixel macroblocks, the scaled picture can have 8×8 pixel macroblocks. Maintaining the same search step for the scaled picture as for the target picture will effectively double the search region used with the scaled pictures. The SMVs determined by the scaled motion search module 306 for a particular target picture block is referred to generically herein by the nomenclature SMV(x,y), where x and y represent the x-y coordinate of a particular picture block within the scaled picture. Note that for clarity, the discussion with respect to the embodiment of FIG. 5 is generic with respect to a macroblock of a video picture, which can be a single video frame block, a video frame block pair, a single video field block, a video field block pair, and the like.

The SMVs 308 for a scaled picture are provided to the SMV modeler module 382 and to the scaled motion vector weighting module 386 that determines corresponding confidence levels of various motion vectors that can be used to further refine the subsequent motion search. The SMV modeler module 382 determines a transfer function 383 that is used by transform module 384 to generate scaled transformed motion vectors (HMVs 309) for blocks of the current scaled picture based upon a block's x-y coordinate location. For example, the SMVs 308 are used by a fitting algorithm to generate a scaled motion vector transfer function by determining the coefficients for one or more transfer equations that model some or all of the scaled motion vector of a picture. For purposes of discussion, it is presumed that each block of a scaled picture is modeled by the transfer function based upon its x-y coordinate. The transfer function can be a linear or non-linear equation. In the particular non-limiting embodiment described herein, the transfer function comprises one or more linear transfer equations of the form:

$$HMV(x,y)=Xc*x+Yc*y+Cc;$$ Equation 1:

where Xc is the coefficient of the x-coordinate of a macroblock, Yc is the coefficient of the y-coordinate of the macroblock, and Cc is a constant. Note that nomenclature used herein generally uses the letter H as a prefix to indicate that a specific element is related to the transfer function generated by the SMV modeler 382. For example, HMV refers to a scaled motion vector generated by the transform module 384 based upon the scaled motion vector transfer function. Operation of the scaled motion vector module 382 will be better understood with reference to FIG. 6.

Figure 6:
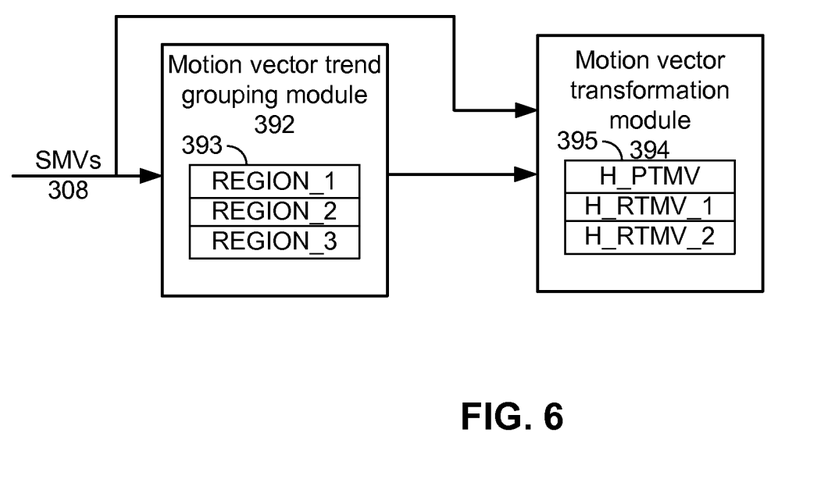
FIG. 6 illustrates a block diagram representative of a SMV modeler of FIG. 5 in accordance with an embodiment of the present disclosure.

FIG. 6 illustrates a particular embodiment of SMV modeler module 382 that determines the transform function used by the transform module 384 based upon motion vector trend regions. The SMV modeler module 382 includes a Motion vector trend grouping module 392 and a motion vector transformation module 394, also referred to as a motion vector fitting modules. In operation, the SMVs for a plurality of scaled pictures, including the SMVs for the scaled version of the current picture (the scaled target picture) being encoded are provided to grouping module 392. Motion vector trend grouping module 392 analyzes the SMVs to determine regions within the scaled target picture that have a common motion vector characteristic, such as a common motion vector trend. These regions are referred to herein as motion vector trend regions.

Each motion vector trend region identified by grouping module 392 includes a set of one or more blocks of the picture, and a corresponding trend motion vector. For example, for a video stream generated by a camera that is following a car driving along a road, the car would appear stable relative to the moving background. Thus, a trend region having motion vectors that trend together from picture-to-picture would include the image of the car, and any macroblocks which may or may not be contiguous with the car that have the same motion vector trend. REGION_1 of location 393 stores information identifying the set of macroblocks making up this first motion vector trend region, and its corresponding motion vector referred to as a trend motion vector (TMV). It will be appreciated that the macroblocks can be identified individually at REGION_1 or as members belonging to geometric shapes identified at REGION_1.

If a second car is illustrated in the same video stream that is moving in the same direction as the first car, but faster, a second motion vector trend region having a different motion vector trend can include the macroblocks associated with the second car. The macroblocks and the TMV of the second motion vector trend region are stored at REGION_2 of the storage location 393. The number of trend motion vector regions determined by the grouping module 392 can vary based upon the content of the video stream, therefore, there can be more or fewer trend regions identified in the storage location 393 that illustrated. Thus, each motion vector trend region determined by grouping module 392 is stored at a location 393 for access by other modules, such as the motion vector transformation module 394 and the scaled motion vector weighting module 386. For ease of illustration, it is assumed that a macroblock can only be a member of one trend region when there are multiple trend regions, and that macroblocks that are not identified by grouping module 392 as belonging to a particular motion vector trend regions can belong to a picture trend region, which can be considered a special type of picture trend region. For example, the background behind the two cars described above, which appears to be moving relative to the cars, can be included in a picture trend region. While many algorithms can be used to identify trend regions, in one embodiment trend regions are determined by separating motion vectors based on their histogram, and using a linear regression algorithm to identify motion trends.

Motion vector transformation module 394 operates on the SMVs to determine a transfer function that can estimate the SMV of each particular picture block of the target picture being encoded based upon the x-y coordinate of each particular picture block. According to one embodiment, the motion vector transformation module 394 determines a motion vector transfer equation for each identified SMV trend region, including the picture trend region, of a current picture using the x-y coordinates of the trend region's picture blocks as input variables. For example, a linear regression approach can be used to model the relationship between the x-y coordinates of macroblocks of a motion vector trend region and their corresponding SMVs 308. For example, the motion vector trend calculation module 394 can determine a motion vector transfer equation (H_RTMV_1) for a first trend region of a picture being analyzed. The motion vector transfer equation H_RTMV_1 is stored at a location of storage location 395. In one embodiment each motion vector transfer equation is defined by a set of linear equations of the following form:

$$H\_RTMV\_1(x,y) \rightarrow H\_RTMV\_1x = Xx1c^*x + Yx1c^*y + Cx1c; \text{ and}$$

$$H\_RTMV\_1y = Xy1c^*x + Yy1c^*y + Cy1c. \quad \text{Equation 2}$$

Thus, Equation 2 is a transfer equation that models the motion vectors for a first trend region of a video picture. Where the first trend region is indicated by the suffix "_1". The transfer equation includes an x-component equation (H_RTMV_1x) used to determine the x-component of a motion vector for a scaled macroblock at a particular x-y coordinate, and a y-component equation (H_RTMV_1y) used to determine the y-component of the particular scaled macroblock. In Equation 2, Xx1c, Yx1c, and Cx1c are coefficients associated with the x-component equation as determined by the motion vector trend calculation module 394, and Xy1c, Yy1c, and Cy1c are coefficients associated with the y-component equation as determined by the motion vector trend calculation module 394. It will be appreciated that there is also a picture trend transfer function H_PTMV(x,y) that can be of the same form as the region transfer equation of Equation 2.

The coefficients for each trend regions' transfer function are stored at storage location 395, as represented by the labels H_RTMV_1 through H_RTMV_3 and H_PTMV, for use by the transform module 384 (FIG. 5). In one embodiment all of the picture blocks of a particular trend region, and their corresponding SMVs are used to generate the corresponding transfer function of that particular region. In an alternate embodiment, only a portion of the macroblocks of a particular trend region having the most similar SMVs are used to generate the transfer equation for that particular trend region. For example, macroblock SMVs of a particular trend region having values which, when plotted on a histogram, are outliers relative to other SMVs of that trend region can be removed prior to calculating the transfer equation for that trend region. Therefore, a transfer function that models each location of a current video picture can be determined based upon a portion of the macroblocks of that picture. In one embodiment, those macroblocks of a trend region having an SMV that is more than a defined standard deviation amount outside of an average SMV of the trend region will not be used when determining the transfer equation of that trend region. The defined standard deviation amount used by the motion vector trend calculation module 394 can be a fixed amount, or a user programmable amount.

Motion vector transform module 384 (FIG. 5) determines transformed motion vectors (HMVs) for blocks of a scaled picture by using sa block's x-y coordinate as an input to the transfer function. For example, a transformed motion vector HMV(X,Y) for a macroblock having a particular x-y coordinate can be determined by inputting the x-y coordinate to the transfer equation of the current picture's transfer function that is associated with that particular x-y coordinate. In this manner, a set of transformed motion vectors (HMV) for the macroblocks of the scaled picture are generated.

The scaled motion vector weighting module 386 of FIG. 5 determines confidence levels for each of the SMVs and HMVs, which are then provided as a final set of SMV-based motion vectors, labeled F_SMV 307, to the coarse motion search module 204. According to a particular embodiment, the scaled motion vector weighting module 386 also determines a confidence level for each of the TMVs, which can be used in the calculation of the conference levels of the SMVs and HMVs. In other embodiments, the TMV confidence levels can also be provided to the coarse motion search engine 204. The SMV and HMV the confidence levels determined by the scaled motion vector weighting module 386 can be based upon relationships within and amongst the various types of available motion vectors (SMVs 308, HMVs 309, TMVs 311). Generation of the motion vector confidence levels by scaled motion vector weighting module 386 will be better understood with reference to the flow diagram of FIG. 7.

Figure 7:
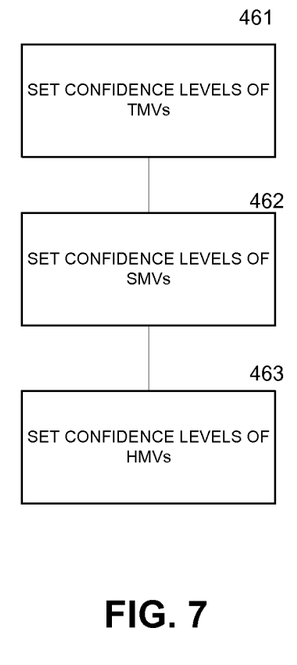
FIG. 7 illustrates a flowchart representation of the operation of the scaled motion vector weighting module 386 of FIG. 5 in accordance with a specific embodiment of the present disclosure.

FIG. 7 illustrates a flow diagram of a particular embodiment of the present disclosure that is applied to the scaled motion vectors of the scaled target picture. At block 461, a confidence level of each TMV of each trend region is determined and can be used to determine the confidence levels of other motion vectors, such as the confidence levels of the SMVs and HMVs. In one embodiment, the confidence level of a particular TMV is based upon the number of macroblocks that make up a particular trend region. Thus, the confidence level of a TMV for a trend region having 100 macroblocks as members would be higher than the confidence level for a trend region having only 10 macroblocks as members. Other characteristics of a trend region can also affect its confidence level. For example, the statistical deviation amongst the SMVs belonging to a particular trend region can affect the confidence level of that trend region. For example, a trend region having a small variance amongst its member SMVs can have a larger conference level, or its confidence level increased, as opposed to a trend region having a larger statistical deviation amongst its members, which can have its confidence level decreased. As a further example, the cohesion amongst the macroblocks making up the members of a trend region can also affect the confidence level of a TMV. For example, if every macroblock of a trend region forms contiguous block of adjacent macroblocks, e.g., each macroblock of the trend region is adjacent to at least one other macroblock of the trend region, the confidence level of that TMV could be increased. Alternatively, the confidence level of trend region can be reduced based upon the number of macroblocks of a trend region that are isolated from any other macroblocks within the trend region, or based upon the number of isolated groups of macroblocks in a trend region. It will be appreciated, that some or all of these trend region characteristics, or additional trend region characteristics, can be taken into account when determining a confidence level of a TMV.

At block 462, the confidence levels of the macroblocks' SMVs are determined. In accordance with a specific embodiment, a SMV of a particular macroblock is assigned a high confidence level, or its confidence level is increased, if it is determined to match the SMVs of its neighbor macroblocks. For example, the SMV of a particular macroblock can be considered to match its neighbor macroblocks if six of its eight neighboring macroblocks, or some other portion that can be fixed or user programmed, have similar motion vectors. Two SMVs can be considered similar if a difference between them is less than one pixel, or some other defined amount, which may also be fixed or user programmable. In addition to determining the confidence level of an SMV based upon whether or not it matches its neighbor block macroblocks, the confidence level of a particular SMV can also be determined based upon the confidence level of its neighbor macroblocks, and its texture indicators, like variance, can also be used to determine the confidence level of a particular SMV. For example, a particular SMV having neighboring macroblocks with high confidence levels will itself be given a higher confidence level, as opposed to a particular SMV having neighboring macroblocks with relatively low confidence levels.

In an alternate embodiment, different or additional criteria can be used to determine whether or not a scaled motion vector matches its neighbor macroblocks. For example the criteria can vary based upon characteristics of the actual SMVs, such as based upon the size of the SMV being compared to other SMVs. For example, the one pixel threshold described above can apply to small SMVs, e.g., SMVs having a value of four pixels or less, while a different criterion can apply to large SMVs, e.g., SMVs having a value of greater than four pixels. According to one embodiment, a large SMV can be considered to match its neighboring SMVs if one-half of its eight neighbors are similar.

Yet another criterion that can be used to determine the confidence level of a particular SMV can be based upon the amount of similarity between the SMV and the TMV of a trend region to which it belongs. For example, the smaller the difference between the SMV and its TMV the greater the confidence level. An additional characteristic that can be used to determine the confidence level of a particular SMV is the number of neighbor macroblocks that belong to the same TMV as the current macroblock, wherein having a greater number of neighboring macroblocks belonging to the same TMV will increase the conference level of SMV, as opposed to reducing the confidence level of SMV having no neighboring macroblocks assigned to the same TMV.

Yet another criteria the can be used to determine the confidence level of a particular SMV can be based upon its similarity to its co-located HMV. In addition, its similarity to its neighbor HMVs can also be used to determine an ultimate confidence level. It will be appreciated, that some or all of the above described characteristics, as well as others, can be used to determine the conference level of SMV.

At block 463 the confidence levels of the macroblocks' HMVs are determined. The techniques used to determine the conference levels of the SMVs as described above, can be used to determine the conference levels of the HMVs as well. In addition, additional characteristics can be used to determine conference levels of the HMVs. For example, the confidence level of the TMV to which the HMV belongs can be used to determine the HMV conference level. I will also be appreciated that instead of using the confidence level of its TMV, the conference level of a particular HMV can instead use one or more of the TMV characteristics TMV characteristics described above. It will be appreciated that the confidence level of a particular type motion vector can be either set to a fixed value in response to meeting a particular criteria, or can be increased or decreased based upon a particular criteria.

A final set of scaled motion vectors and their confidence levels (F_MV 387) can include the SMVs, TMVs, HMVs, as needed, and are provided to the candidate control module 362 of the coarse motion search module 204 along with the target picture information 260 (FIG. 5). Note that instead of providing the actual HMVs to the candidate control module 362, that the transform function coefficients 383 can instead be provided to the candidate control module 362 along with their calculated confidence levels to allow the candidate control module 362 to calculate the HMV values as needed.

The candidate control module 362 uses the target picture information 260 to determine a set of unscaled predicted motion vectors (PMVs) for the target picture being encoded based on any conventional or proprietary motion vector prediction technique. Thus, the PMVs are determined from the pictures of the target video stream, not from the scaled video stream 261. The candidate control module 362 uses the F_SMV 387 information and the calculated PMVs to determine a set of motion vector candidates (PMV_C 388) that are provided to the coarse motion search engine 310. The coarse motion search engine uses the CMVs 388 for a particular macroblock location to initiate a coarse-scale motion search algorithm for that macroblock. Operation of the candidate control module 362 will be better understood with reference to FIG. 8.

Figure 8:
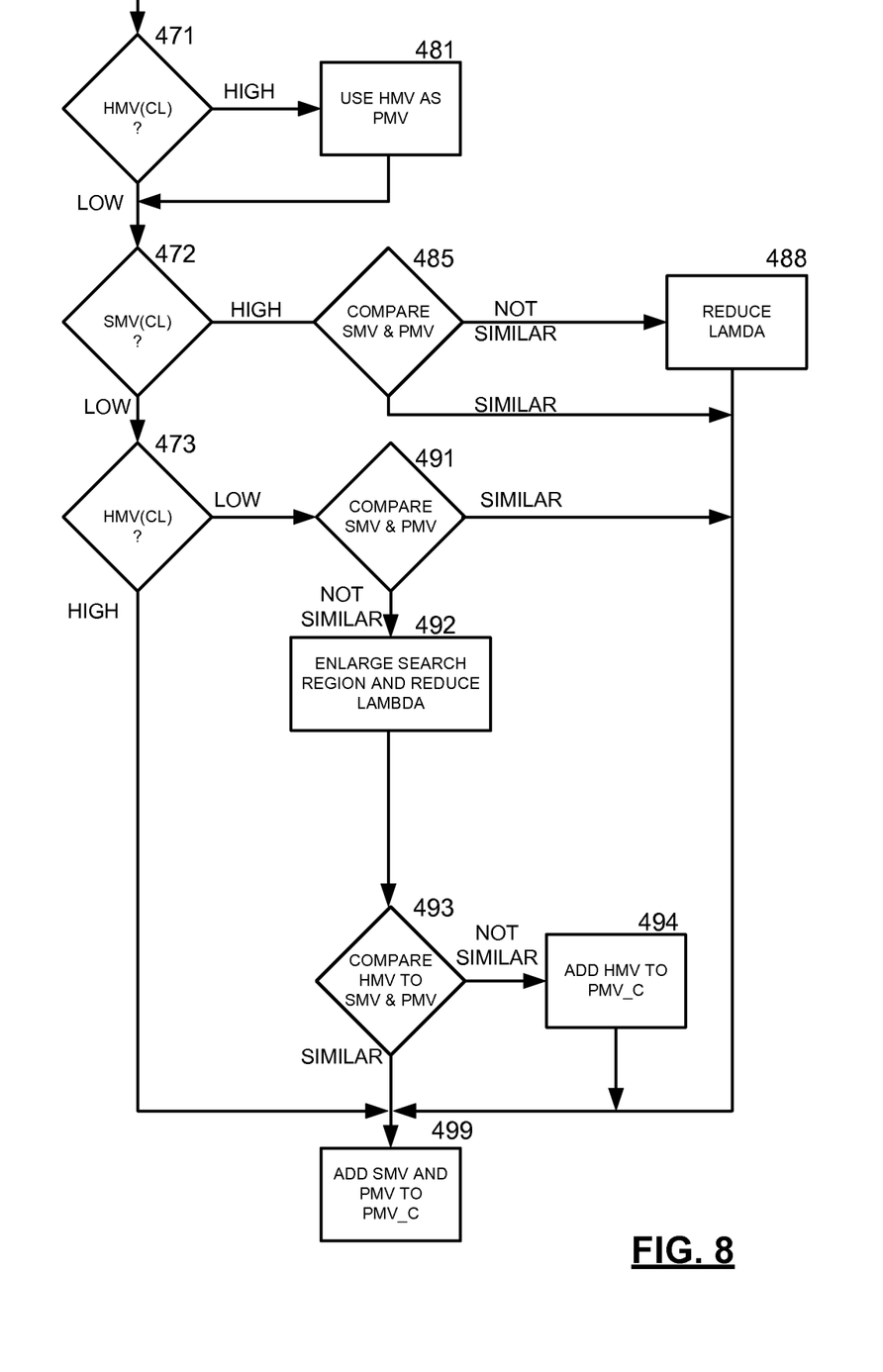
FIG. 8 illustrates a flowchart representation of the operation of the candidate control module of FIG. 5 in accordance with a specific embodiment of the present disclosure.

FIG. 8 illustrates a flow diagram of particular embodiment of the operational flow of the candidate control module 362, which determines the PMV_Cs 388. It will be appreciated, that while the decision blocks described with reference to FIG. 8 make binary determinations, such as high versus low, or similar versus not similar, the an alternate embodiments, more levels of decision can be used to more precisely control the information provided to the subsequent search blocks.

At decision block 471, it is determined whether or not the confidence level of the current macroblock's HMV is high or low, and proceeds to block 481 when high, and to block 472 when low. It will be appreciated, that the threshold that defines a boundary between what constitutes a high and low confidence level at block 471 can be a fixed value or user programmable value. It will also be appreciated, that for purposes of discussion that it is presumed that HMVs have been calculated for each corresponding macroblock location of the target picture. However, in other embodiments, such as when processing bandwidth is limited, it is not necessary that each macroblock location of a target picture will have a correspondent HMV.

At block 481, the high confidence level associated with the HMV of the current macroblock results in the value of PMV being replaced by the value of HMV, and flow proceeds to block 472. At decision block 472, it is determined whether or not the confidence level of the current macroblock's SMV is high or low. It will be appreciated, that the threshold that defines a boundary between the high confidence level and the low confidence level at block 472 can be the same or different threshold as used with respect to block 471. Flow proceeds to block 485 when it is determined that the confidence level of the current macroblocks SMV is high, otherwise flow proceeds to block 473.

At decision block 473 it is determined whether or not the confidence level of the current macroblock's HMV is high or low. It will be appreciated, that the threshold that defines a boundary between the high confidence level and low confidence level of HMV at block 473 can be the same or different as a threshold as described for previous blocks. Flow proceeds to block 491 when it is determined that the confidence level of the current macroblock's HMV is low, otherwise flow proceeds to block 499.

At block 499, both the SMV and the PMV of the current macroblock are included in the set of PMV_C. it will be appreciated, that SMVs and HMVs included in the set of PMV_C will have their lengths adjusted by a commensurate amount to which the target picture was scaled at the downscaling model 302. For example, if each macroblock of the original target picture was downscaled by a factor of two, their corresponding SMVs will have their X and Y coordinates doubled when included in the set of PMV_C.

Returning to block 472, flow proceeds to block 485 in response to determining that the confidence level of the current macroblock's SMV is high. At block 485, the current macroblock's SMV and PMV are compared to each other. Whether or not two motion vectors are considered similar or not similar can be determined based upon the difference between difference between the two motion vectors and a defined threshold criteria that can be the same criteria used to determine whether or not two motion vectors match as described previously. The threshold criteria used to determine whether or not an SMV and a PMV match can be fixed or user programmable. It will further be appreciated, that the magnitude of the SMV vectors will need to be adjusted to compensate for the fact that it is a scaled representation of the target picture. As previously described, the threshold that can be fixed or user programmable can vary based upon the size of the motion vectors being compared, and the like. In response to the SMV and the PMV being similar, the flow proceeds to block 499. Otherwise, in response to determining that the SMC and PMV of the current macroblock are not similar, the flow proceeds to block 488 where lambda is reduced before flow proceeds to block 499.

Returning to block 473, if it is determined that the confidence level of the current macroblocks HMV is low, flow proceeds to block 491. At block 491, the current macroblocks SMV and PMV are compared in a manner similar to that described with respect to block 485. It will be appreciated, that the criteria used to determine similarity at block 491 to be the same or different than the criteria used to block 485. In response to determining that the SMV and PMV are similar, flow proceeds to block 499. Otherwise, flow proceeds to block 492.

At block 492, the search region to be used with respect the current macroblock is enlarged. For example, instead of searching a 7×7 pixel region around a candidate motion vector during the course search, the search region can be enlarged, for example to a 25×25 pixel region. The amount to search region is enlarged can be a fixed amount, or user programmable amount. In addition, at block 492 the value of lambda, which is used by the search engine to determine a cost associated with a particular motion vector, is reduced. Flow proceeds to block 493 from block 492.

At block 493, the current macroblock's HMV is compared to both its SMV and to its PMV to determine whether or not the HMV is similar to either. Flow proceeds to block 494 in response to neither SMV nor PMV being similar to HMV. Otherwise, flow proceeds to block 499. At block 494, the HMV of the current macroblock is added to set of PMV_C.

Thus, there has been described herein an apparatus and method, as well as several embodiments including a preferred embodiment, for implementing a video processing device, a video encoder/decoder and deblocking filter module for use therewith. Various embodiments of the present disclosure herein-described have features that distinguish the disclosure from the prior art.

In a first aspect, a method can include determining a transfer function that models a relationship between locations of macroblocks of a first video picture and corresponding motion vectors of the macroblocks, and implementing a motion vector search to determine a first motion vector of a first macroblock of a second video picture, the motion vector search based upon a first candidate motion vector calculated using the transfer function, wherein the first video picture has a different resolution than the second video picture.

In one embodiment of the first aspect, the method includes determining the transfer function includes determining the transfer function based upon a portion of the macroblock motion vectors that the transform function models. In another embodiment, the method includes determining the corresponding motion vectors based on a motion search of the first video picture. In a particular embodiment, the method includes down-scaling the second video picture to obtain the first video picture. In a further embodiment, the method includes down-scaling the second video picture to obtain the first video picture. In another particular embodiment, the second video picture is rendered from compressed video information.

In another embodiment of the first aspect, determining the transfer function includes determining a plurality of regions of the first video picture, and determining a corresponding linear equation for each one of the plurality of regions. In still another embodiment, the transfer function is a linear transfer function.

In a second aspect, a method can include evaluating a set of motion vector candidates at a motion search engine to determine a motion vector of a macroblock of a target picture being encoded, wherein the set of motion vector candidates is determined based upon a transfer function that models the relationship between the coordinates of a scaled picture's macroblocks and the motion vectors corresponding to the scaled picture's macroblocks, the scaled picture being based upon the target picture.

In one embodiment of the second aspect, the scaled picture represents the same image at a lower a lower resolution as does the target picture. In a particular embodiment, the transfer function is a linear transfer function. In another particular embodiment, the method includes determining the transfer function based upon a linear regression algorithm. In still another particular embodiment, the method includes determining the transfer function based upon a portion of the locations of the scaled picture's macroblocks.

In a further embodiment of the second aspect, the transfer function includes a first equation associated with a first portion of the scaled picture's macroblocks and a second equation associated with a second portion of the scaled picture's macroblocks. In another embodiment, the method includes determining to include a first motion vector calculated using the transfer function, and a second motion vector is a motion vector predicted from target and not from the scaled picture.

In a third aspect, a device can include a video scalar to generate a downscaled first video picture from a second video picture, and a motion vector fitting module to determine the coefficients of a transfer function that models the relationship between macroblock coordinates and motion vectors of the macroblock locations of the first video picture.

In one embodiment of the third aspect, the transfer function is a linear transfer function. In another embodiment, the device can include a grouping module to identify regions of the first video picture having a matching motion vector characteristic, wherein the transfer function includes a separate set of coefficients for each region of the regions. In still another embodiment, the device includes a candidate selection module to determine a set of candidate motion vectors based upon the transfer function, and a motion search module that initiates motion vector searches of the second video picture based upon the candidate motion vectors. In a further embodiment, the device includes a candidate selection module to determine whether a transformed motion vector calculated from the transfer function is to be included in a set of candidate motion vectors, and a motion search module to initiate motion vector searches of the second video picture based upon the candidate motion vectors.

While particular combinations of various functions and features of the present disclosure have been expressly described herein, other combinations of these features and functions are possible that are not limited by the particular examples disclosed herein are expressly incorporated in within the scope of the present disclosure.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but it not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its currents level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present disclosure, a module includes a functional block that is implemented in hardware, software, and/or firmware that performs one or module functions such as the processing of an input signal to produce an output signal. As used herein, a module may contain submodules that themselves are modules.

It will be apparent to those skilled in the art that the disclosed disclosure may be modified in numerous ways and may assume many embodiments other than the preferred forms specifically set out and described above. Accordingly, it is intended by the appended claims to cover all modifications of the disclosure which fall within the true spirit and scope of the disclosure.

For example, while the use of a transform function based upon scaled motion vectors has been described to determine transformed motion vectors that can be included n the set of PMV_Cs, it will be appreciated that a transform function based upon the unscaled motion vectors could also be used in a similar manner. In addition, it will be appreciated that while the transfer function based upon the SMVs 308 has been described as consisting of a plurality of motion vector transfer equations that are determined on a motion vector trend region by motion vector trend region basis, that in other embodiments the scaled motion vector transfer function can be determined using criteria other than motion vector trend region information. For example, predefined regions, such as quadrants or other size regions, of a current video picture, can be used to identify the macroblocks used by the motion vector transformation module 395 for a given motion vector transfer equation. It will also be appreciated that transformed motion vectors (HMVs) do not need to be calculated for each macroblock. For example, depending upon the available processing, transformed motion vectors can be calculated for only a portion of the macroblock locations.

What is claimed is:

1. A method comprising:
   determining a set of macroblocks of a first video picture having corresponding x-y coordinates and motion vectors, the set of macroblocks including a first macroblock and a second macroblock, the first macroblock having a first x-coordinate and a first y-coordinate, the second macroblock having a second x-coordinate and a second y-coordinate;
   determining a transfer function that models a motion vector for each corresponding macroblock of the set of macroblocks based on the x-y coordinate of the corresponding macroblock, wherein determining the transfer function includes
      determining a first coefficient of the transfer function corresponding to the x-coordinates of the set of macroblocks;
      determining a second coefficient of the transfer function corresponding to the y-coordinates of the set of macroblocks;
   determining a first candidate motion vector for the first macroblock based upon the transfer function, wherein determining the first candidate motion vector includes multiplying the first coefficient by the first x-coordinate and multiplying the second coefficient by the first y-coordinate;
   first motion vector search based on the first candidate motion vector to determine a first motion vector of a third macroblock of a second video picture, wherein the first video picture has a different resolution than the second video picture;
   determining a second candidate motion vector for the second macroblock based upon the transfer function, wherein determining the second candidate motion vector includes multiplying the first coefficient by the second x-coordinate and multiplying the second coefficient by the second y-coordinate;
   implementing a first motion vector search based on the second candidate motion vector to determine a second motion vector of a fourth macroblock of the second video picture.

2. The method of claim 1 wherein the transfer function is determined using motion vectors of the first video picture determined by a motion search of the first video picture.

3. The method of claim 2 further comprising: down-scaling the second video picture to obtain the first video picture.

4. The method of claim 3, wherein the second video picture is rendered from compressed video information.

5. The method of claim 1 further comprising: down-scaling the second video picture to obtain the first video picture.

6. The method of claim 1 wherein determining the transfer function comprises determining a plurality of regions of the first video picture including a region corresponding to the set of macroblocks, and determining a corresponding linear equation for each one of the plurality of regions.

7. The method of claim 1, wherein the transfer function is a linear transfer function.

8. A method comprising: evaluating a set of motion vector candidates at a motion search engine to determine a motion vector of a macroblock of a target picture being encoded, wherein the set of motion vector candidates is determined based upon a transfer function that models the relationship between the coordinates of a scaled picture's macroblocks and the motion vectors corresponding to the scaled picture's macroblocks, the scaled picture being based upon the target picture, wherein each motion vector candidate of the set of motion vector candidates is determined by multiplying a first coefficient of the transfer function to an x-coordinate of a macroblock corresponding to the motion vector candidate and multiplying a second coefficient of the transfer function to a y-coordinate of the macroblock corresponding to the transfer function.

9. The method of claim 8, wherein the scaled picture represents the same image at a lower a lower resolution as does the target picture.

10. The method of claim 8, wherein the transfer function is a linear transfer function.

11. The method of claim 8 further comprising: determining the transfer function based upon a linear regression algorithm.

12. A device comprising:
a video scalar to generate a downscaled first video picture from a second video picture;
a motion vector fitting module to determine the coefficients of a transfer function, including a first and second coefficient, that models the relationship between a set of macroblock coordinates of the first video picture and motion vectors corresponding to the set of macroblocks; and
a motion vector transformation module comprising a first input to receive the x-coordinate of a current macroblock, a second input to receive the y-coordinate of the current macroblock, a third input to receive the coefficients, and an output to provide a motion vector candidate for the current macroblock that is based upon the product of the first coefficient and the x-coordinate and the product of a second coefficient and the y-coordinate in response to the x-coordinate and y-coordinate being a member of the set of macroblock coordinates.

13. The device of claim 12, wherein the transfer function is a linear transfer function.

14. The device of claim 12 further comprising: a grouping module to identify regions of the first video picture having a matching motion vector characteristic, wherein set of macroblock coordinates corresponds to one of the regions.

15. The device of claim 12, further comprising:
a motion search module that initiates motion vector searches of the second video picture based upon the candidate motion vectors.

16. The device of claim 12, further comprising:
a candidate selection module comprising an input connected to the output of the motion vector transform module to determine whether the motion vector candidate is to be included in a set of candidate motion vectors; and
a motion search module to initiate motion vector searches of the second video picture based upon the candidate motion vectors received from the candidate selection module.

* * * * *